Oct. 30, 1956 P. S. MORGAN 2,768,664
QUICK ACTING CLAMPING DEVICE
Filed April 22, 1952
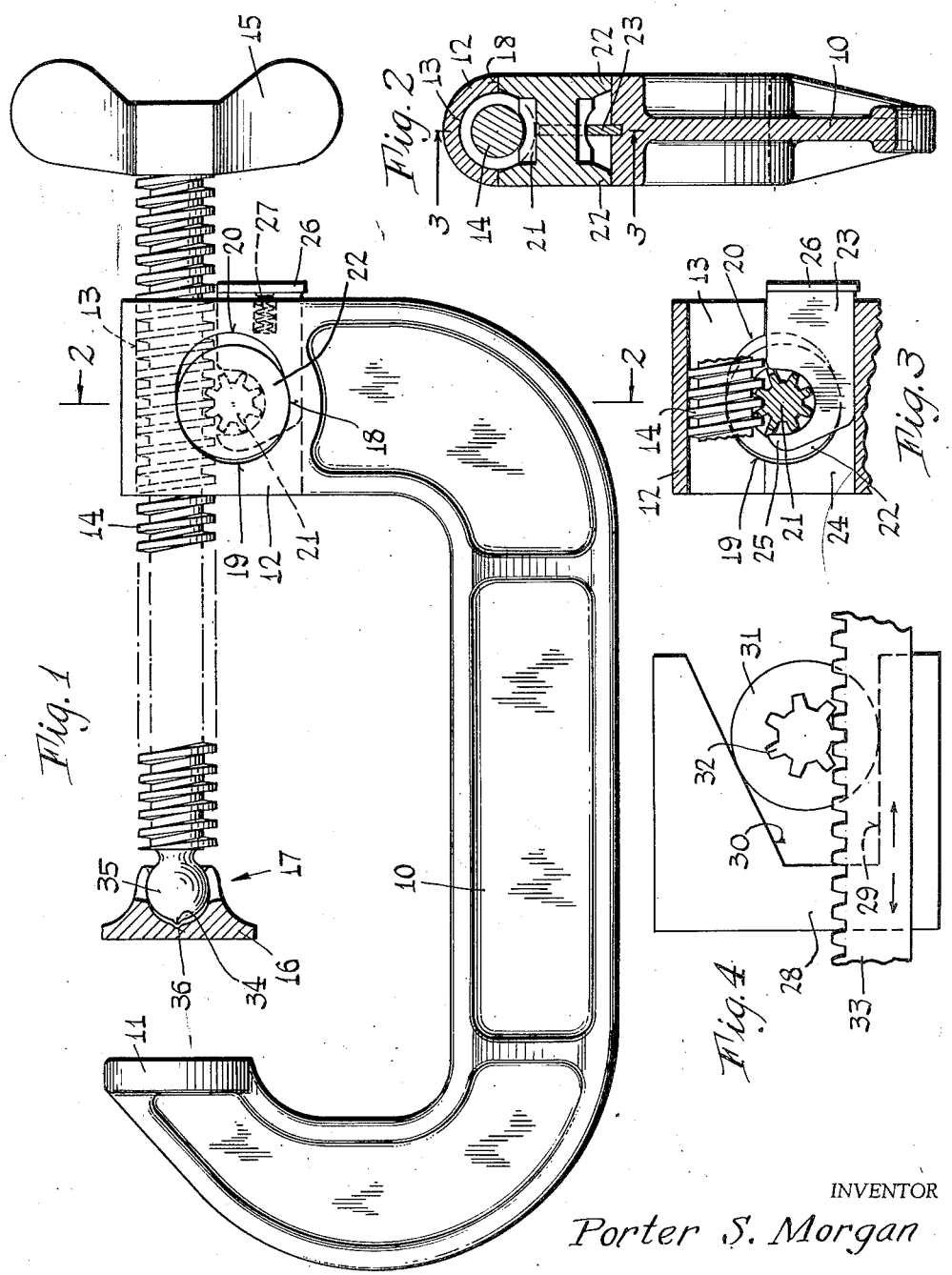
INVENTOR
*Porter S. Morgan*
BY *Johnson and Kline*
ATTORNEYS

United States Patent Office 2,768,664
Patented Oct. 30, 1956

2,768,664

QUICK ACTING CLAMPING DEVICE

Porter S. Morgan, Westport, Conn., assignor to I. L. Hartenberg, Fairfield, Conn., as trustee Application April 22, 1952, Serial No. 283,557

9 Claims. (Cl. 144—305)

This invention relates to clamping devices, and more particularly to automatic or self-setting clamps having quickly adjustable parts, wherein there is a stepless or smooth, unidirectional retrograde brake action as distinguished from a stepped, ratchet-type action.

The invention is shown as applied to a C-clamp; however it should be understood that the invention is not limited to the specific embodiment illustrated herein, but instead has utility in connection with clamping devices generally, intended for other purposes and uses than these specifically disclosed.

An object of the invention is to provide an improved quick-acting clamp having stepless retrograde brake action, which is simple in construction with relatively few parts, yet is effective and reliable in its operation.

A further object of the invention is to provide an improved quick-acting screw type clamp which has a rapid advancing movement of the parts and a smooth, stepless retrograde brake action, and yet which can apply powerful pressures to a workpiece by the usual rotary screw action.

Another object of the invention is to provide an improved clamp in accordance with any of the foregoing, which is relatively small and compact, and economical to manufacture.

A still further object of the invention is to provide an improved clamp with stepless retrograde brake action, which is easy to operate and understand, and to adjust to the desired setting.

Another object of the invention is to provide an improved clamp as above set forth, which may be quickly and easily released.

In accomplishing the above objects I provide an improved clamping device comprising a pair of members arranged to transmit clamping forces, said members having relative advancing and retrograde movement. One of said members has toothed formations extending along the direction of said movement, and in the illustrated embodiment of the invention this member constitutes a screw. I provide a toothed wheel rotatably carried by the other member, meshing with the said toothed formations or screw, and provide a friction brake wheel secured to the toothed wheel to turn therewith and to control the turning thereof. On the wheel-carrying member there is provided a fixed brake surface engageable by the brake wheel, and further provided means guiding said brake wheel into wedging engagement with the brake surface to hold the wheels against turning in response to force applied to the toothed wheel by the screw in the direction of retrograde movement. The brake wheel will thereby be locked, and will prevent retrograde movement of the clamping members.

In the specific illustrated embodiment of the invention I provide two brake wheels, disposed on opposite sides of the toothed wheel, and make the brake wheels of greater diameter than the toothed wheel to effect a desirable mechanical advantage and a more effective locking action.

The arrangement is such that the entire wheel assembly is free to rotate rapidly in response to relative advancing movement of the members to clamp an object, and accordingly there is had a desirable, quick-acting clamp with a positive, stepless braking action where retrograde movement is concerned.

In the specific embodiment of the invention illustrated herein the brake wheels are carried in a bore in the one clamping part, said bore being egg-shaped or out-of-round, having a semicylindrical free-running portion permitting free quick turning of the wheels, and having wedging portions or surfaces against which the brake wheels may be locked. The screw which meshes with the toothed wheel passes between and engages peripheral portions of the brake wheels, effectively positioning the wheel assembly and preventing appreciable axial movement thereof.

Release of the locked wheels is effected by a manually operable member slidably mounted on the clamp and engageable with the assembly to shift the brake wheels out of wedging engagement with the brake surfaces. The release mechanism may be actuated to release the clamping members even when these are exerting considerable pressure on a clamped object, by virtue of the stepless or smooth action of the unidirectional brake mechanism.

Other features and advantages will hereinafter appear.

In the accompanying drawings:

Figure 1 is a side elevational view of an improved C-clamp embodying the invention.

Fig. 2 is a fragmentary vertical section taken on line 2—2 of Fig. 1.

Fig. 3 is a fragmentary vertical section taken on line 3—3 of Fig. 2.

Fig. 4 is a diagrammatic representation illustrating the principle of the stepless unidirectional brake.

Referring to Figs. 1 and 2, the C-clamp embodying this invention comprises a frame 10 having a fixed jaw portion 11 and having, opposite the jaw portion 11, a screw-carrying portion 12 provided with a smooth bore 13 the axis of which is directed toward the jaw 11. Passing through the bore 13 is a conventional screw member 14 having at one end a handle 15 and at the other end a rockable jaw 16, secured thereto by a ball-and-socket connection 17.

In accordance with the present invention an improved stepless unidirectional brake mechanism is provided on the frame portion 12 for engagement with the screw 14 whereby a smooth quick adjustment of the screw may be effected in the direction of its advance, whereby undesired retrograde movement of the screw is effectively prevented, and whereby powerful clamping forces may be exerted on the clamped object by turning the screw in the usual manner.

In accomplishing this I provide an out-of-round or egg-shaped bore 18 in the frame portion 12, said bore intersecting the bore 13 at right angles thereto and having its axis spaced below the axis of the bore 13. The bore 18 has a substantially cylindrical portion 19 constituting approximately one-half of its surface, that disposed nearest the clamping jaws, and on out-of-round wedging and braking portion 20 constituting the other half of its surface, disposed nearest the handle 15.

For engagement with the threads of the screw 14 there is provided a toothed wheel 21, meshing with said threads, and on opposite sides of said toothed wheel are provided brake wheels 22 fixedly secured to the toothed wheel to turn therewith and to control the turning thereof. The brake wheels 22 are slightly smaller in diameter than the cylindrical portion 19 of the bore 18, but preferably are appreciably larger in diameter than the toothed wheel 21 for reasons to be hereinafter disclosed. The wedging and braking portions 20 of the bore 18 are so arranged that the brake wheels 22 will readily become wedged therein and locked against turning if such wheels should be urged toward said wedging portions. On the other hand, the brake wheels 22 may freely turn in the cylindrical portions 19 of the bore 18, if maintained in said portions.

Accordingly it will be seen that if the screw 14 is given an advancing movement, that is, toward the left as viewed in Fig. 1, the brake wheels 22 will be maintained in the cylindrical portion 19 of the bore 18, and will turn freely, permitting such advancing movement. On the other hand, if it is attempted to shift the screw 14 in a retrograde direction, that is, toward the right as viewed in Fig. 1, it will cause the brake wheels 22 to enter the wedging portions 20 of the bore 18 whereby they will become locked and be prevented from turning.

Normally the brake wheels 22 are yieldably held in engagement with the wedging portions 20 of the bore 18 by a release mechanism comprising a release plate 23 slidably mounted in a slot 24 in the frame portion 12, said plate having a semicircular portion 25 partially surrounding the toothed wheel 21 and engaging the teeth thereof. The release plate 23 extends beyond the frame 12 and has a finger piece 26 engaged by a helical compression spring 27 carried in the frame portion 12. The finger piece 26 and plate 23 are normally urged to the right as viewed in Fig. 1, tending to maintain the brake wheels 22 in the wedging portions 20 of the bore 18.

It should be noted, however, that the action of the release plate 23 and spring 27 by themselves is not enough to lockingly wedge the brake wheels 22 against turning, if, for example, the screw 14 is shifted to the left (Fig. 1) while the frame 10 is held stationary, or if the frame 10 is shifted to the right while the screw 14 is held stationary, since for such relative movement of the screw and frame the force on the wheel 21 will shift the wheels 22 away from the wedging portions 20 of the bore 18, freeing the said brake wheels for turning.

An analysis of the action of the stepless unidirectional brake mechanism of this invention may be readily had from an inspection of Fig. 4. In this figure a frame member 28 is shown, having friction or brake surfaces 29 and 30 making a small acute angle with each other. Engageable with the brake surfaces 29 and 30 is a brake wheel 31 having fixedly secured to it a toothed wheel 32 engageable by a rack 33 which is movable in reverse directions, either to the left or to the right as indicated by the arrows. If it is attempted to shift the rack 33 to the left, it will move the brake wheel 31 into locking engagement with the brake surfaces 29 and 30 and prevent rotation of the wheels 31 and 32, and movement of the rack 33. If, however, the rack 33 is urged to the right, it will shift the wheel 31 edgewise to the right, out of wedging engagement with the surfaces 29 and 30, and thereafter if the wheels are suitably mounted for rotation they will rotate freely in response to continued movement of the rack 33 to the right.

The rack 33 in Fig. 4 is shown as completely meshing and engaging with the wheel 32. Thus the rack and toothed wheel assume some of the force which would otherwise be assumed by the braking surface 29 if there were clearance and looseness between the rack and toothed wheel. It will be evident from Fig. 4 that the brake surface 29 constitutes a guiding means and tends to guide the wheel 31 into braking engagement with the brake surface 30, and also that the rack 33 and pinion 32 constitutes a guide means and tends to guide the brake wheel 31 into braking engagement with the surface 30. Guidance is provided, therefore, by two separate means, and if looseness were to exist between the rack and pinion, then guidance would be provided only by the surface 29. Or, if the surface 29 were either wholly dispensed with or moved downward, as viewed in Fig. 4, then guidance would be provided solely by the rack 33 and pinion 32. As shown in Fig. 4, however, both the surface 29 and the rack and pinion guide the brake wheel 31 into braking engagement with the brake surface 30. Since the brake surface 29 is parallel with the rack 33, guidance by either the brake surface 29 or the rack 33 would not alter the functioning of the brake.

Considering Fig. 1 it will be seen that force applied to the screw 14 to advance it against the jaw 11 will shift the wheels 22 into the cylindrical bearing portion of the bore 18 wherein they may turn freely, and accordingly such movement will free the screw and enable it to continue its advance. If, however, it is attempted to shift the screw 14 to the right as viewed in Fig. 1 the brake wheels 22 will be shifted edgewise into the wedging and braking portions 20 of the bore 18, such movement being aided by the spring 27 and resulting in a locking of the wheels and consequent locking of the screw 14 against retrograde movement.

This action may be advantageously utilized in applying the C-clamp to a work piece, as follows: The clamp may be opened to its widest extent by depressing the finger piece 26 to maintain the brake wheels 22 in the free turning portion 19 of the bore 18. The finger piece 26 is now released. After the work piece has been inserted between the jaws 11 and 16, the screw 14 may be quickly advanced by merely shifting it to the left as viewed in Fig. 1, without turning it. When the object which is to be clamped has been fully engaged by the jaws 11 and 16 a powerful clamping force may then be exerted by merely turning the screw 14 to advance it, by use of the handle 15. During such action the toothed wheel 21 will remain locked and function in the manner of a nut, providing mating threads for the threads of the screw 14.

When it is desired to release the clamp it is merely necessary to depress the finger piece 26 whereupon the locking wheels 22 will be shifted to the free-turning portion of the bore 18, quickly releasing the screw 14. The latter may then be fully retracted, as desired.

By virtue of the stepless braking action provided by this invention, the quick release of the clamp may usually be effected merely by depressing the finger piece 26 without resorting to unscrewing of the screw 14, since the release of the screw does not first entail an axial movement thereof in the clamping direction as is often necessary with ratchet devices.

It is pointed out that the turning movement of the brake wheels 22 when they are shifted into the free-turning portion 19 of the bore 18 against the action of the plate 23 and spring 27 is relatively easy. The mere weight of the screw 14 or of the clamp frame 10 is sufficient to so shift the wheels and cause relative advance movement of the screw 14. Thus, if the clamp when open is held solely by the handle 15 with the jaw portion 11 uppermost, the frame 10 by virtue of its weight will shift the wheels away from the wedging portions 20 and will quickly descend along the screw 14, bringing the jaws 11 and 16 together quickly. This action may be utilized in the use of the clamp. Also, the weight of the screw 14 is sufficient to cause in the same manner free turning of the wheel assembly 21, 22 if the open C-clamp is held solely by the frame 10 with the handle portion 15 uppermost. The screw 14 if left free will quickly descend, to close the clamp.

By the present invention the brake wheels 22 are made appreciably larger in diameter than the toothed wheel 21, and accordingly a desirable effective locking action is had even though considerable force is exerted by the screw 14 on the toothed wheel 21. It will be understood that, since the toothed wheel 21 is much smaller in diameter than the brake wheels 22 a mechanical advantage is provided whereby the retarding friction forces on the peripheries of the wheels 22 need not be so great to still maintain the wheels locked.

I have discovered that a definite relation exists between the angle measured between the brake surfaces 29 and 30, see Fig. 4, and the relative diameters of the brake wheel 31 and the toothed wheel 32, or the angle measured between the brake surface 30 and line of movement of the rack 33, and the said relative diameters. The greater the diameter of the brake wheel 31 with respect to the diameter of the toothed wheel 32, the greater the angle which may be provided between the surfaces 29 and 30 without impairing the effectiveness of the lock or braking action, and vice versa. In Fig. 4 a relatively large acute angle is shown between the surfaces 29 and 30; in Fig. 1 the acute angle between the engaged portions of the wedging surfaces of the bore 18 is seen to be smaller than that shown in Fig. 4.

The ease with which the lock is released upon pressure being exerted on the finger piece 26 is related to the angle of the wedging surfaces. If the angle is smaller a greater force is required on the finger piece 26 to release the lock, and vice versa. Referring to Fig. 2, it will be seen that the screw 14 extends between the peripheral portions of the brake wheels 22 and engages said portions, thereby preventing appreciable axial movement of the wheel assembly and maintaining the parts in their assembled positions. Disassembly of the parts may be effected by removing the jaw 16 from the screw 14 and shifting the screw to the right as viewed in Fig. 1, entirely out of the bore 13. Upon this being done, the wheel assembly 21, 22 may be easily removed axially from the bore 18.

By the present invention means are provided, tending to hold the rockable jaw 16 in a predetermined parallel position with regard to the jaw 11 as pressure is applied to a work piece by the jaws. This means comprises a nib 34 on the ball part 35 of the ball-and-socket connection 17, and comprises a recess 36 in the socket, arranged to receive the nib 34.

Variations and modifications may be made within the scope of the claims and portions of the improvements may be used without others.

I claim:

1. In a clamp, a pair of members for transmitting clamping forces, said members having relative advancing and retrograde movement and one of said members having tooth formations extending along the direction of said movement; a toothed wheel rotatably carried by the other member, meshing with the said tooth formations; a friction brake wheel secured to the toothed wheel to control turning thereof, both said wheels being free to rotate in response to relative advancing movement of said members to clamp an object; means providing a fixed brake surface on the wheel-carrying member, engageable by said brake wheel to lock the wheels against turning in response to force applied to the toothed wheel by said tooth formations in the direction of retrograde movement thereof, thereby to prevent retrograde movement of the members, said brake wheel having a greater diameter than the toothed wheel to effectively prevent slippage of said wheels during said application of force to the gear wheel, said one member having means to cause relative advancing movement of the members while the wheels are locked.

2. The invention as defined in claim 1 in which there is a second brake wheel of the same diameter as the first, fixedly secured to the opposite side of the toothed wheel, in which there is a second brake surface on the wheel-carrying member, engageable by said second brake wheel, in which the toothed formations comprise a screw extending between the peripheral portions of the brake wheels, said screw and brake wheels being engageable with each other to provide for axial positioning of said wheels.

3. In a quick-acting screw-mechanism, a pair of members which are relatively movable in advancing and retrograde directions, one of said members having screw threads; a toothed wheel rotatably carried by the other member, said wheel having a limited edgewise movement and at all times meshing with said screw threads; and a friction brake wheel fixedly secured to the toothed wheel to control turning thereof, both said wheels being free to rotate in response to relative advancing movement of the members; means providing a fixed brake surface on the wheel-carrying member, engageable by an annular portion of said brake wheel to lock the wheels against turning in response to force applied to the toothed wheel by said screw threads in the direction of retrograde movement of the screw-carrying member, thereby to prevent said movement, said locked toothed wheel constituting a mating thread element for the screw thread whereby relative advance of said members is effected when there is relative turning between them about the axis of the screw thread.

4. The invention as defined in claim 3 in which there is a second brake wheel of the same size as the first, fixedly secured to said wheels, in which there is a second brake surface on the wheel-carrying member, engageable with the second brake wheel, said brake wheels being disposed on opposite sides of the toothed wheel, in which the wheel-carrying member has bearing surfaces engaging the brake wheels to provide for their free rotation and to prevent appreciable axial movement thereof, and in which said screw thread-carrying member comprises a screw extending between and engaging said brake wheels and preventing appreciable axial movement of all the wheels.

5. The invention as defined in claim 3 in which there is means for shifting the brake wheel from braking engagement with the brake surface, said means comprising a manually operable part movably mounted on the wheel-carrying member, having a curved portion engaging and partially encircling the toothed wheel to shift the latter, thereby to shift the brake wheel out of said braking engagement when said part is shifted.

6. In a C-clamp, a C-shaped frame having a fixed jaw at one end, and having a smooth bore through its other end, the axis of which is directed toward the said fixed jaw; a screw carried in the bore of the frame, having a jaw at one end arranged to cooperate with the jaw of the frame, said frame having a second bore extending substantially at right angles to and intersecting the first bore but with its axis spaced from the axis of the first bore; a pair of brake wheels in the second bore, for engagement with the surface thereof, said second bore being out-of-round and having pairs of angularly disposed wedging portions engageable with the brake wheels, said wheels extending on opposite sides of the screw; and a toothed wheel disposed between the brake wheels and rigidly secured thereto, meshing with the threads of the screw, said second bore having semicylindrical portions permitting free rotation of the wheels when the screw is advanced toward the fixed jaw of the frame, and said wedging portions locking the brake wheels upon initial movement of the screw in the opposite direction.

7. The invention as defined in claim 6 in which there is means urging the brake wheels in engagement with said wedging portions which comprises a manually operable member having a semicircular portion partially encircling the toothed wheel and engageable with the latter, said member being manually movable to shift the brake wheels out of said engagement.

8. In a clamp, a pair of members for transmitting clamping forces, said members having relative advancing and retrograde movement and one of said members having tooth formations extending along the direction of said movement; a rotatable toothed wheel meshing with the said tooth formations; a pair of friction brake wheels fixedly secured to opposite sides of the toothed wheel to turn therewith and to control the turning thereof, the said other member having an out-of-round bore a portion of which is semicylindrical and provides a turning bearing for the brake wheels, said bore having another portion provided with sloping wedging surfaces engageable by the wheels, the slopes of said surfaces at their points of engagement making a small acute angle with each other, and said bore being so positioned that all the wheels are free to rotate in response to relative advancing movement of the members to clamp an object, said brake wheels being wedged and locked against turning in response to force applied to the toothed wheel by said tooth formations in the direction of retrograde movement, said one member having means to cause relative advancing movement of the members while the wheels are locked.

9. The invention as defined in claim 8 in which the brake wheels are of larger diameter than the toothed wheel to cause an effective locking of the latter in response to the said force.

References Cited in the file of this patent

UNITED STATES PATENTS

| | | |
|---|---|---|
| 298,704 | Norris et al. | May 3, 1884 |
| 323,776 | Bennett | Aug. 4, 1885 |
| 656,410 | Larsen | Aug. 21, 1900 |
| 1,197,063 | Robinson | Sept. 5, 1916 |
| 1,719,630 | Smith | July 2, 1929 |
| 1,966,064 | Gloor | July 10, 1934 |
| 2,190,585 | Rhinevault | Aug. 22, 1936 |
| 2,414,348 | Woerner | Jan. 14, 1947 |
| 2,430,458 | Farrell | Nov. 11, 1947 |
| 2,576,420 | Simonsen | Nov. 27, 1951 |